United States Patent [19]

Bouniol

[11] Patent Number: 4,906,408
[45] Date of Patent: Mar. 6, 1990

[54] MEANS FOR THE CONDITIONING OF RADIOACTIVE OR TOXIC WASTE IN CEMENT AND ITS PRODUCTION PROCESS

[75] Inventor: Pascal Bouniol, Vincennes, France

[73] Assignee: Commissariat a l'Energie Atomique, Paris, France

[21] Appl. No.: 274,764

[22] Filed: Nov. 22, 1988

[30] Foreign Application Priority Data

Dec. 2, 1987 [FR] France ............... 87 16716

[51] Int. Cl.⁴ .............................. G21F 9/16
[52] U.S. Cl. .................... 252/628; 252/633; 405/128; 106/89; 106/97; 106/104; 106/117
[58] Field of Search .............. 252/628, 633; 250/506.1, 507.1; 106/100, 104, 85, 103

[56] References Cited

U.S. PATENT DOCUMENTS

| H 625 | 4/1989 | McDaniel et al. | 252/628 |
|---|---|---|---|
| 3,507,801 | 4/1970 | Kausz et al. | 252/628 |
| 4,116,705 | 9/1978 | Chappell | 106/90 |
| 4,122,028 | 10/1978 | Iffland et al. | 252/631 |
| 4,321,158 | 3/1982 | Beall et al. | 252/628 |
| 4,379,081 | 4/1983 | Rootham et al. | 106/97 |
| 4,452,635 | 6/1984 | Noshi et al. | 106/74 |
| 4,476,048 | 10/1984 | Ambros et al. | 252/632 |
| 4,530,723 | 7/1985 | Smeltzer et al. | 106/90 |
| 4,620,947 | 11/1986 | Carlson | 252/626 |
| 4,775,495 | 10/1988 | Izumida et al. | 252/628 |
| 4,800,042 | 1/1989 | Kurumada et al. | 252/628 |
| 4,804,498 | 2/1989 | Mizuno et al. | 252/628 |

FOREIGN PATENT DOCUMENTS 2402632 4/1979 France .
2432752 2/1980 France .

OTHER PUBLICATIONS

Chemical Abstracts, vol. 104, 1986, No. 155307v.
Zement-Kalk-Gips, vol. 34, No. 9, 1981.

Primary Examiner—Howard J. Locker
Attorney, Agent, or Firm—Nutter, McClennen & Fish

[57] ABSTRACT

A process for conditioning radioactive or toxic waste which can contain boron in a cement-based matrix comprises mixing the waste in a drum in the presence of water with non-aluminous cement, aluminous cement and optionally a siliceous compound and/or a boron-containing compound, in order to form a cement matrix containing stable phases of the straetlingite, calcium monoboroaluminate and borated ettringite type and, if desired, placing around the drum a mortar layer, which can be prepared from cement, deflocculated fumed silica, siliceous sand, smectic clay and water.

16 Claims, 1 Drawing Sheet

MEANS FOR THE CONDITIONING OF RADIOACTIVE OR TOXIC WASTE IN CEMENT AND ITS PRODUCTION PROCESS

The present invention relates to the processing, with a view to long term storage, of radioactive or toxic waste possibly containing borate ions. More precisely, it relates to the conditioning of such waste materials in hydraulic binder-based matrixes constituted by cements.

In nuclear power stations, impurities appearing in the water of the primary circuit are often eliminated by ion exchange resins in mixed, i.e. anionic and cationic beds. At the end of the operation, the used or spent resins essentially contain activation products, including $^{60}$Co, traces of fission products, including $^{137}$Cs and a boron-lithium mixture used as the neutron poison in the water of the circuit, in the form of a $H_3BO_3$-LiOH neutralizer. These spent ion exchange resins constitute medium activity waste ($10^2$ to $10^3$ Ci/m$^3$) in view of their $^{60}$Co content and the period of the latter (T=5.24 years), which must be coated or enveloped with a view to their storage until the activity disappears.

Among the presently known processing processes, interest is attached to those involving the incorporation of the waste into cement due to their relatively low cost and their ease of realization. However, in the case of ion exchange resins containing borate ions, it is difficult to use this process due to undesirable interactions between the resins and the cement mixture or dimensional variations of the resins, which cast doubts on the integrity of the coated or enveloped objects obtained.

In nuclear installations, the waste to be treated includes borated concentrates, which are also medium activity waste materials, whose incorporation into the cement also causes certain problems.

In order that a process for the conditioning of waste by incorporation in cement is satisfactory, it is necessary to obtain: a physical immobilization of the waste in a non-dispersable form, i.e. a locking in the cement matrix, a retention and confinement of the radionuclides, in particular the more unstable radionuclides, such as $^{137}$Cs, a prevention of any water leaching phenomenon, an adequate mechanical strength of the product obtained to permit handling and resistance to shocks with a value of at least 12 MPa after 28 days in accordance with ANDRA specifications, a dimensional stability of the product obtained, i.e. an absence of significant contraction or expansion, a correct durability of the cement matrix with respect to chemical attacks and its own evolution in time, and an adequate biological protection to not exceed dose rates of 200 mrads/h in contact with the final package.

Moreover, it is desirable that the process makes it possible to incorporate into the cement matrix a waste quantity representing at least 50% of the apparent volume of the enveloped object obtained and that the enveloping operations are easy and fast not leading to the obtaining of new effluents or any other contamination.

When it is wished to incorporate into the cement waste constituted by ion exchange resins containing borate ions, it is impossible to obtain the aforementioned results as a result of the prejudicial effects occurring during the enveloping of the waste and/or during the ageing of the enveloped product, which are, in part, due to the affinity of the ion exchange resins for water and, on the other hand, to the presence of borate ions.

Firstly, ion exchange resins chemically react with the constituents of the cement and liberate borate ions, which inhibit the setting of the latter. Thus, on incorporating the resins, into a cement paste, the mixing water rapidly acquires a very high ionic strength due to the solubilization of the calcium silicates with the appearance of Ca(OH)$_2$ and which is adequate to displace part of the Li$^+$ and B(OH)$_4^-$ ions, respectively, carried by the cationic and anionic resins. There follows the dissolving of borate ions and the precipitation of a not very soluble mineral cortex based on boron and calcium around the cement grains, which consequently stops the evolution of their hydration. The retaining-sealing effect conventionally observed with boric acid and borates prevents the setting of the enveloped object for several days or even weeks, thus limiting the production flow of the conditioned waste.

Moreover, as soon as they come into contact with the cement, the cationic resins exchange their Li$^+$ ions for Ca$^{++}$ ions, which are very numerous in the medium and they contract slightly. This is also applicable with regards to the anionic resins where the B(OH)$_4^-$ ion is partly exchanged with the OH$^-$ ion (size difference of the hydrated ions).

Secondly, the ion exchange resins have a considerable affinity for water and their grains can consequently have dimensions which vary as a function of their water content.

Thus, the behaviour of the cement-resin mixture during its mixing phase varies as a function of the moisture state of the resin grains. When using a high resin quantity, the mixture becomes too stiff if the grains are partly dehydrated, because there is competition with the cement for the mixing water. However, the mixture becomes too liquid if there is a water excess compared with the minimum content enabling the resin grains not to contract. Moreover, the density contrast between the resin grains (1.2) and cement particles (2.9 to 3.2) then produces segregations.

These chemical reactions and said affinity for water of the resin grains also leads to certain prejudicial effects during the hardening and ageing of the hardened product.

Thus, when the product is able to harden, the mechanical strength values after 28 days are very low for the most interesting resin incorporation rates, no matter what the cement quantity used. In the most favorable cases, with matrix compositions supplying only very high mechanical strengths, it is not possible to incorporate more than 30% by volume of resin without dropping below 30 MPa, this mediocre level corresponding by weight to approximately 20% of wet resins and 15% of dry resins.

The immersion of the hardened product in water leads to its expansion and cracking and finally crumbling. This destruction is due to extremely high tensions appearing locally on each resin grain (up to a few dozen MPa) following reabsorption of water in their porous system. Two separate phenomena are responsible for this:

(a) during setting, the resins have given up water to the cement hydrates during development and have contracted (a part is also played by the variation of the osmotic conditions), (b) the resins have exchanged their ions with the ions present in the cement and have contracted during hardening.

Thus, as the still soft cement paste initially maintains its contact with the wall of the resin grains, the diameter of the latter in the hardened material is below the water saturation diameter prior to enveloping, so that under these conditions remoistening of the resins in the enveloped object leads to bursting.

Moreover, the capillary water present in the resin grains is subject to radiolysis, which increases the tensions within the hardened product.

Finally, the ion exchange resins have a poor thermal conductivity, which does not facilitate the heat dissipation during the setting of the cement.

In order to overcome these disadvantages, a process is known which consists of subjecting the resins to a pretreatment by an aqueous solution containing ions of alkaline earth metals and/or metal ions of valency at least equal to 3, prior to incorporating them into the cement and as is described in Japanese patent KOKAI 48/28 899. However, when the waste materials are constituted by ion exchange resins containing borate ions, this process does not make it possible to eliminate the disadvantages due to the liberation of borate ions in the medium. Moreover, it suffers from the disadvantage of requiring a preliminary pretreatment stage prior to the incorporation of the waste into the cement.

Thus, none of the presently known processes makes it possible to simultaneously overcome the disadvantages due to the affinity of the ion exchange resins for water and the presence of the borate ions in the waste.

Another problem occurring in connection with the treatment of the waste materials constituted by ion exchange resins is the difficulty of knowing whether these resins do or do not contain boron and in the case that they contain it how much boron is present.

In addition, it would be desirable to produce a radioactive waste conditioning matrix usable in the case of various different waste types and which could therefore receive cationic, anionic, regenerated or non-regenerated resins with or without boron or lithium.

The present invention specifically relates to a process for the conditioning of radioactive or toxic waste optionally incorporating borate ions, which makes it possible to overcome the disadvantages described hereinbefore and to bring about the enveloping of miscellaneous waste materials which do or do not contain boron.

The process according to the invention for the conditioning of radio active or toxic waste, which may contain borate ions in a cement-based solid matrix is based on two aspects:

(a) the production of an enveloping matrix associated with the synthesis of particular minerals (chemical aspect of the process)

(b) the optional presence of an over-enveloping material, which is itself based on cement and makes it possible to improve the confinement for the waste material packages overall (geometrical aspect of the process).

The process for the production of the enveloping matrix comprises:

(a) mixing the waste materials in the presence of water with aluminous cement, non-aluminous cement and optionally a siliceous product and/or a compound containing boron in proportions such that a mixture is formed, which gives rise to the crystallization of stable mineral phases of the straetlingite, calcium monoboroaluminate and/or borated ettringite types, apart from the standard hydrates of the non-aluminous cement and (b) allowing the mixture to harden to form the solid matrix containing at least one of these phases.

In this process, as a solid matrix containing a stable phase of the straetlingite, monoboroaluminate and/or borated ettringite types is formed around the waste materials, it is possible to avoid the prejudicial chemical interactions between the optionally borated waste and the cement or water. Moreover, it is possible to bring about the hardening of the mixture in one day, while avoiding any physical or chemical pretreatment operation with respect to the waste.

Generally, the water, non-aluminous cement, aluminous cement and siliceous compound quantities used are such that the weight ratio between the water/(non-aluminous cement+aluminous cement+siliceous compound) is below 0.5.

Preferably, the weight ratio of the non-aluminous cement to the aluminous cement is in the range 1 to 20.

When the weight ratio between the water/(non-aluminous cement+aluminous cement+siliceous compound) is low, e.g. below 0.4, it is preferable to add to the mixture a fluidizing agent in order to assist the operation of mixing the constituents. The fluidizing agent used can be chosen from the group of melamines and napthalene sulphonates.

According to a first embodiment of the process according to the invention, the aluminous and non-aluminous cements used in stage (a) are chosen and there is an addition of a siliceous product and, optionally, a compound containing boron in proportions such that between them is formed a straetlingite type-alumino-siliceous crystalline phase.

This phase can be easily realized at ambient temperature and makes it possible to attain the following advantages:

(1) formation of a stable compound not subject to a mineralogical conversion phenomenon, as in the case of aluminous cement hydrates and also preventing the crystallization of the latter,
(2) development of high mechanical strength characteristics as a result of favorable crystalline faces (hexagonal system),
(3) good resistance to chemical attacks and to thermal action, because the decomposition temperature of straetlingite is 200° to 250° C.,
(4) limited dimensional variations in air or under water,
(5) good affinity for radioactive elements such as cesium, which can be incorporated into the crystal lattice of straetlingite.

In this case, the non-aluminous cement is preferably a cement formed from Portland clinker suitable for the preparation of prompt mixtures. Examples of such cements are ordinary Portland cement (CPA), Portland cement with an additive such as calcarous filler, a pouzzelan, etc. (CPJ), cement with blast furnace slag and fly ash (CLC) and blast furnace slag cement (CLK).

The other mineral phases formed in variable proportions in the matrix and accompanying the straetlingite and conventional cement hydrates contain boron. These are borated ettringites and calcium monoboroaluminate, whose structure is based on the known ettringite and monosulphoaluminate in cements:

$6CaO.Al_2O_3.B_2O_3.42H_2O$: BOROETTRINGITE 1
$6Cao.Al_2O_3.2B_2O_3.39H_2O$: BOROETTRINGITE 2
$8CaO.2Al_2O_3.B_2O_3 25H_2O$: MONOBORALUMINATE

These highly hydrated minerals consequently bring about an intervention of aluminium and they can be found in a ternary diagram CaO—Al$_2$O$_3$—B$_2$O$_3$ with all the more conventionally encountered phases.

Figure 1:
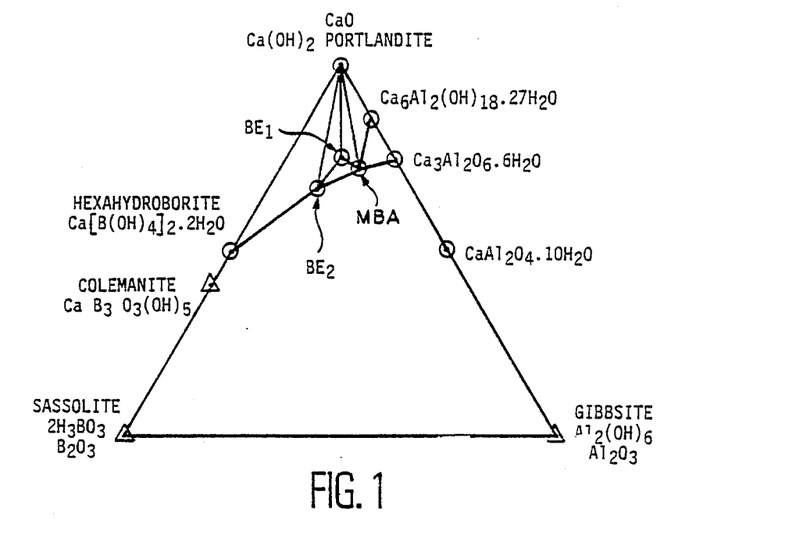
FIG. 1, already described, the theoretical ternary diagram of the system CaO—Al$_2$O$_3$—B$_2$O$_3$.

FIG. 1 shows such a ternary diagram, in which the considered phases are as follows:

| | |
|---|---|
| H$_3$BO$_3$ | sassolite (boric acid), |
| Ca(OH)$_2$ | portlandite, |
| Ca[B(OH)$_4$]$_2$.2H$_2$O or CaO.B$_2$O$_3$.6H$_2$O | hexahydroborite, |
| 8CaO.2Al$_2$O$_3$.B$_2$O$_3$.25H$_2$O | "monoboroaluminate" (MBA) |
| 6CaO.Al$_2$O$_3$.2B$_2$O$_3$.39H$_2$O | "boroettringite 2" (BE2) |
| 6CaO.Al$_2$O$_3$.B$_2$O$_3$.42H$_2$O | "boroettringite 1" (BE1) |
| 6CaO.Al$_2$O$_3$.36H$_2$O | "calciettringite" |
| 3CaO.Al$_2$O$_3$ | tricalcium aluminate |
| CaO.Al$_2$O$_3$ | monocalcium aluminate |
| Al$_2$(OH)$_6$ | gibbsite |

In this diagram, the compositions corresponding to the formation of a phase of the boroettringite and monoboroaluminate type are located in the area of the system defined by boroettringites 1 and 2 and the monoboroaluminate.

These highly hydrated minerals constitute very polymorphous reception structures for the borate ion B(OH)$_4^-$. Their limited solubility does not prevent the existence of a certain quantity of boron in solution, whose function is to regulate the setting of the mixture of aluminous and non-aluminous cements, including the presence therein of accelerating ions resulting from a waste such as lithium.

When the radioactive waste materials to be conditioned are borated liquid concentrates, it is not necessary to add a boron compound and, in this case, in stage (a) mixing takes place between the radioactive waste and the aluminous cement, the non-aluminous cement based on Portland clinker and a siliceous compound.

However, in the case of other radioactive waste materials, such as borated or non-borated ion exchange resins, in stage (a) mixing takes place between the waste and the water, the aluminous cement, the Portland clinker-based non-aluminous cement, a siliceous compound and a compound containing boron, the latter for regulating setting.

According to the invention, the conditioning of the radioactive waste can be further improved by placing a mortar layer around the hardened mixture. In this case, the arrangement around the hardened product of a mortar layer used for over-enveloping makes it possible to improve its mechanical and confinement properties while incorporating a higher waste quantity.

Thus, the inventive process has numerous advantages, namely: the absence of pretreatment greatly simplifies the process overall, the realization of the solid matrix having mineral phases of the straetlingite, monoboroaluminate and/or ettringite types is very simple and only uses commercially available cements, the volume of waste incorporated into the solid matrix is high and can represent up to 60% by volume absolute of the mixture, the mechanical strength of the hardened product obtained in stage (a) is adequate to permit its handling as from 15 days and there is neither swelling, nor cracking in the presence of water, and the final package containing the waste enveloped in the matrix and optionally the over-enveloping mortar layer satisfies the ANDRA storage conditions with a mechanical strength respectively equal for each material to 12 and 35 MPa after 28 days. The invention will be better understood from reading the following description given in an illustrative and non-limitative manner and with reference to the attached drawings, wherein show:

According to the first embodiment of the inventive process, the constituents and the proportions of the constituents to be mixed with the waste are chosen so as to preferably crystallize a mineral phase of the straetlingite type.

It is a hydrated calcium aluminosilicate corresponding to the hydration product of gehlenite. Its structural formula reads:

$$Ca^{2+}{}_2[SiO_4]^{4-}Al_2^{3+}[OH]_6^-\cdot 5H_2O$$

This mineral can be obtained in numerous different ways, e.g. by reacting lime with metakaolin, or more simply by reacting calcium silicate hydrates (CSH) of a Portland clinker-based cement and calcium aluminate hydrates (CAH$_{10}$) of an aluminous cement.

The latter case corresponds to "prompt mixtures", which are Portland cement-based compositions generally containing between 20 and 80% aluminous cement. These mixtures, whose setting time can be greatly reduced, are conventionally used for producing sealing joints, sealing and surfacing purposes, because they have relatively low mechanical strength characteristics.

In these mixtures, the rapid setting is due to a speeding up of the hydration of the aluminates by the lime of the Portland cement and, when the lime is consumed, to an activation of the dissolving of the silicates. In addition, when these mixtures are hardened in the absence of borate ions, the very high hydration heat is dissipated in a short space of time and the temperatures reached for high material masses lead to contraction, cracking and incomplete hydration of the cement particles. The limited development and interlacing of the aluminous or siliceous hydrate crystallites are responsible for the limited resistance or strength. However, when these mixtures are hardened in the presence of borate ions, the situation is greatly modified because this element then serves as a powerful regulator.

Thus, the hydration of the Portland cement is slowed down and consequently there is a delay to setting, which compensates the activation of the aluminous cement, whose hydration is itself inhibited by boron. This has the following beneficial consequences: a setting time exceeding 6 hours, but less than 24 hours, a progressive removal of the heat, slow growth and putting into place of the hydrate crystals which is favorable for obtaining appropriate strength or resistance characteristics, a start of setting taking place with an excess of water so that the borated waste, e.g. ion exchange resin grains, can retain the maximum size prior to hardening, a development of primary borated ettringite not leading to expansion, because it takes place within a still plastic matrix, whereas this mineral, which expands, normally leads to cracking when it appears following hardening, and a favorable rheology of the mixture obviating the use of a fluidizer (solely in the case of cementation of the concentrates).

Moreover, the mineralogical assembly obtained after hardening has no aluminous hydrates for which conventionally time-based recrystallization problems occur.

According to the chemical environment of the borate ions in the waste, there is also a primary or secondary growth of calcium monoboroaluminate in the hardened enveloped object without any particular consequence regarding the quality thereof.

On starting with a prompt mixture containing 50% Portland cement and 50% aluminous cement, the straetlingite appearance conditions are as follows:

(1) dissolving of $Ca^{2+}$ and $AlO_2^-$ ions leading to a priority hydration of the aluminous cement or the production of $CAH_{10}$ and $C_2AH_8$ hydrates, (2) the hydration of the Portland cement commences when most of the aluminous cement has been transformed into hydrates, the straetlingite appearing as a consequence of this and can be detected after 1 day.

The water content of the mixture conditions the evolution of the mineralogical associations. Thus, with a low water/cement ratio, the least water-rich stable cubic hydrate $C_3AH_6$ is formed with the straetlingite, whose crystallization is limited by the water deficiency.

Moreover, the lack of reactivity of the $C_3AH_6$ hydrate with respect to the siliceous products of the mixture also prevents straetlingite formation.

With a high water/cement ratio, the calcium aluminate hydrates $CAH_{10}$ and then $C_2AH_8$ precede the appearance of straetlingite ($C_2ASH_8$), which normally forms by reaction with hydrated silicates (CSH) in accordance with the following reaction diagrams:

$$2CAH_{10} + C_3S_2H_3 \rightarrow 2C_2ASH_8 + CH + 6H \quad (1)$$

$$2C_2AH_8 + C_3S_2H_3 \rightarrow 2C_2ASH_8 + 3CH \quad (2)$$

Reaction (1) is faster than reaction (2), but in both cases the kinetics are controlled by the hydration of calcium silicates:

$$2C_3S + 6H \rightarrow C_3S_2H_3 + 3CH \quad (3)$$

$$2C_2S + 4H \rightarrow C_3S_2H_3 + CH \quad (4)$$

Thus, in each case lime is formed. However, the presence of the latter, due to an initial or temporary excess, has the effect of inhibiting straetlingite formation and aiding that of inert aluminate hydrate $C_3AH_6$.

In addition, for crystallizing straetlingite, it is important not to associate with the aluminous binder either a cement containing free lime, or a fortiori pure lime. Preference is therefore given to the use of a Portland clinker-based cement, such as CLC, CLK, CPJ, or CPA, as the non-aluminous cement.

To assist the appearance of straetlingite, it is also necessary to add a siliceous compound to the mixture of the aluminous and non-aluminous cement with water.

Numerous siliceous compounds can be suitable from the time that they are able to supply silica. Examples of such siliceous compounds are pozzuolanas, clays, metakaolin, kieselguhr, fumed silica, ground quartz, silica gels, powders of glass or sodium silicate.

In the case where the waste to be conditioned is constituted by liquids formed by borated concentrates, it is not necessary to add a boron-containing compound to the mixture. However, in the case of waste not containing boron or containing a difficultly estimatable quantity, a water-soluble boron compound is added to the mixture.

Thus, in mixtures of aluminous cement, cement based on Portland clinker and a siliceous compound chosen so as to obtain the stoichiometric composition of the straetlingite, this formation can be regulated by the presence of boron in the hydration liquid.

The action mechanism can be summarized in the following way: interaction of the $[B(OH)_4]$ ions with the $Ca^{2+}$ ions in solution as from the start of mixing, depletion of $Ca^{2+}$ ions in solution and sealing action of the interaction products greatly inhibiting the hydration of the aluminous cement essentially constituted by monocalcium aluminate CA, the hydration of the calcium silicates being completely blocked, hydrates of calcium aluminates $CaH_{10}$ and $C_2AH_8$ are formed and cannot be converted into inert $C_3AH_6$, calcium boroaluminates (boroettringite or monoboroaluminate) then appearing in the place thereof, with the hydration of the aluminous cement completed, the calcium silicates start to react to form straetlingite $C_2ASH_8$, the boroettringite is generally destabilized to the advantage of the straetlingite and monoboroaluminate.

Thus, in this case, the completely hydrated and solidified matrix essentially comprises straetlingite and calcium monoboroaluminate in stable form.

As hereinbefore, the massive supply of lime must be prevented in the presence of boron because, apart from the risk of incorrect setting by hexahydroborite crystallization, there is an activation of the aluminous binder and a complete deregulation of the system with excessively fast setting. However, the mixing water can contain lime up to saturation.

According to the invention, preference is given to the use of water-soluble boron compounds, e.g. orthoboric acid, borax and borates in general.

According to the invention, it is also possible to use different types of aluminous cements. However, preference is given to the use of cements with a high alumina content, e.g. cements of the Secar type, rather than cements of the Fondu type which contain too many impurities. Moreover, Secar cements are white and cannot be confused with Portland-based cements. In the case of the latter, it is appropriate to use types, where the sulphate content does not exceed 2.5% by weight otherwise there may be an interference with the Ca-Al-B system due to setting deficiencies.

This first embodiment of the inventive process can be used for the treatment of waste of various types and in particular ion exchange resins or borated liquid concentrates.

In the case of ion exchange resins, the latter can be cationic resins in the form $H^+$ or $Li^+$, anionic resins in the form $OH^-$ or $[B(OH)_4]$, or mixed cationic and anionic exchange resin beds.

In the case of cationic exchange resins in form $H^+$, the affinity of the resin for $Ca^{2+}$ ions of the cement is high and leads to the liberation of $H^+$, which salts out the acidity. The calcium taken at the expense of the aluminous and non-aluminous cements is in low concentration in solution and the mixture is highly regulated.

In the case of cationic exchange resins in form $Li^+$, the affinity of the resin for the calcium ions leads to the liberation of lithium. However, as lithium is an activating element, a normal setting of the cement can be obtained.

In the case of anionic exchange resins in form $OH^-$, the affinity of the resins for the $[B(OH)_4]$-ions present in the mixture and resulting from the boron compound, leads to the liberation of $OH^-$ ions in the mixture. Thus, the boron, which constitutes a setting regulating element is partly consumed by the resin and setting is normal.

In the case of anionic exchange resins in form $[B(OH)_4]^-$, a high regulation of the mixture is obtained by the addition of the boron compound.

In the case of mixtures of resins in form $H^+$ and $OH^-$, the setting is relatively highly regulated with the fixation of $Ca^{++}$ ions and the formation of water.

In the case of mixtures of ion exchange resins in form $Li^+$ and $(B(OH)_4)^-$, setting is normal because there is a liberation of lithium and therefore an activating element, which compensates the presence of the inhibiting element.

This embodiment of the inventive process can also be used for the treatment of borated liquid concentrates. In this case, it is a question of aqueous solutions containing boron, generally in the form of sodium borate and it is not necessary to add either water or a boron compound.

Thus, the boron dissolved in the concentrate is sufficient for completely regulating the prompt mixture. The accelerating action of the sodium ion does not totally compensate the inhibiting action of the boron and the calcium borates which may appear initially are progressively destroyed in the presence of the aluminium ions of the aluminous cement to the benefit of the calcium monoboroaluminate, which is abundantly represented at the sides of the straetlingite. The latter progressively crystallizes as from the non-aluminous binder and the siliceous supply, conversion into $C_3AH_6$ being blocked by the boron.

The following examples 1 and 2 illustrate this first embodiment of the inventive process.

EXAMPLE 1: CONDITIONING OF ION EXCHANGE RESINS

In this example, treatment takes place of ion exchange resins, which have been compressed and decanted/settled under water, which corresponds to the storage of ion exchange resins in a dosing container from which the quantity to be treated is discharged hydraulically.

The standard porosity state associated with the apparent volume occupied by the compressed-decanted resins can be defined by a virtual void index, u corresponding to a porosity n of 25%:

$$n_{REI} = \frac{u}{1+u} = 0.25 \text{ i.e. } u_{REI} = \frac{1}{3} = 0.333$$

This implies an apparent volume equal to:

$$V_{APP} = (1+u)V_{REI} = 1.333 V_{REI}$$

The resins are conditioned in cement in such a way as to obtain a volume enveloping level $k_v$ equal to $\frac{2}{3}$, defined by the ratio $V_{APP}/V_T$ with $V_T$ representing the total volume of the enveloped object, i.e. $V_T = V_{REI} + V_E + V_C$ with $V_E$ representing the water volume, $V_C$ the cement volume and REI being the ion exchange resin.

The apparent volume of the ion exchange resins comprises the real volume $V_{REI}$ and the saturating water volume $V_{ESAT}$, the mixing water volume $V_{EGA}$ is such that $V_E = V_{ESAT} + V_{EGA}$. By choosing an enveloping level $k = \frac{2}{3}$, it follows that as $V_{APP} = 4/3 V_{REI}$, the real volume $V_{REI} = V_T/2$, i.e. the real volume of the ion exchange resins occupies half the total volume of the enveloped object. Moreover, the saturating water volume is equal to $V_{APP} - V_{REI} = V_T/6$.

On choosing a relatively low void index of the paste, so as to compensate the possible water excess supplied by the resins, e.g. an index $u_P = V_E/V_C = 0.875$, with $V_C$ representing the total volume of aluminous and non-aluminous cements and the siliceous compound, we obtain $V_C(1+u_P) = V_P$, with $V_P$ representing the paste volume, which is equal to $V_T/2$ and to $V_C + V_E$. Thus, we obtain:

$V_C = 4V_T/15$, $V_E = 7V_T/30$, and $V_{EGA} = V_T/15$.

In the case of an apparent volume of 1 liter of compressed-decanted ion exchange resins to be treated, the volumes involved are consequently as follows:
$V_{REI} = 750$ ml, $V_{ESAT} = 250$ ml, $V_{EGA} = 100$ ml, $V_C = 400$ ml, i.e. $V_T = 1500$ ml and $V_P = 750$ ml.

In order to now estimate the respective quantities of the aluminous cement, non-aluminous cement and siliceous compound to be used, in order to obtain the virtual composition of the straetlingite, i.e. $Ca_2Al_2SiO_7$, $nH_2O$, it is possible to operate in the following way.

On designating by Ca/Al/Si the number of atoms of calcium, aluminium and silicon respectively necessary for the synthesis of 1 mole of straetlingite, X the weight of non-aluminous cement to be introduced for 1 mole of straetlingite (weights expressed in g), Y the weight of aluminous cement for 1 mole of straetlingite, z the weight of siliceous additive for 1 mole of straetlingite and $Ca_x$, $Ca_y$, $Ca_z/Al_x$, $Al_y$, $Al_z/Si_x$, $Si_y$, $Si_z$ the number of atoms of each which can be effectively liberated by 1 g of each constituent X, Y or Z, the weight of the various ingredients leading to the straetlingite composition is given by solving the system:

$$\begin{pmatrix} Ca \\ Al \\ Si \end{pmatrix} = \begin{pmatrix} Ca_x & Ca_y & Ca_x \\ Al_x & Al_y & Al_z \\ Si_x & Si_y & Si_z \end{pmatrix} \cdot \begin{pmatrix} X \\ Y \\ Z \end{pmatrix} = \begin{pmatrix} 2 \\ 2 \\ 1 \end{pmatrix}$$

By e.g. choosing: for the non-aluminous binder, a CLC 45 with: $Ca_x = 8.114 \cdot 10^{-3}$; $Al_x = 2.118 \cdot 10^{-3}$; $Si_x = 4.827 \cdot 10^{-3}$, the value of $Ca_x$ takes account of all the calcium of the cement; for the aluminous binder: SECAR 71 with: $Ca_y = 4.457 \cdot 10^{-3}$; $Al_y = 10.789 \cdot 10^{-3}$; $Si_y = 0$, the value $Al_y$ not taking account of the inert $-Al_2O_3$ fraction; for the siliceous additive: a fume silica with: $Ca_z = 0$; $Al_z = 0$; $Si_z = 15.595 \cdot 10^{-3}$.

The solutions are as follows:

$$X = \frac{2(Ca_y - Al_y)}{Ca_y Al_x - Ca_x Al_y} = 162.155 \text{ g},$$

$$Y = \frac{2(Al_x - Ca_x)}{Ca_y Al_x - Ca_x Al_y} = \frac{2 - XAl_x}{Al_y} = 153.528 \text{ g},$$

$$Z = \frac{1 - XSi_x}{Si_z} = 13.937 \text{ g}.$$

This calculation shows that the proportions of the aluminous and non-aluminous cements are substantially equivalent, which corresponds to a typical prompt mixture. Moreover, the siliceous compound proportion, i.e. the fumed silica to be used represents less than 10% of the cement and consequently corresponds to the dosing recommended for this constituent in cements. With regards to the boron addition, the latter must be compatible with a complete solubilization in the water of the mixture in order to avoid the presence of residual boron source in the matrix.

In the case of orthoboric acid $H_3BO_3$, the limited solubility of said acid (approximately 50 g/1 at 20° C.) leads to the use of an approximate quantity of 15 g for the liquid volume associated with the conditioning of 1 liter apparent of compressed-decanted ion exchange resins, i.e. 350 ml in all.

Consequently, in order to respect the determined liquid volume for mixing, the water volume $V_{EGA}$ must be corrected as follows:

$$V_{EGA} = 100 - M_{H_3BO_3}/m_{H_3BO_3} = 100 - 15/1.5 = 90 \text{ ml},$$

in which $m_{H_3BO_3}$ represents the orthoboric acid weight used, i.e. 15 g and $m_{H_3BO_3}$ represents the volume weight of the $H_3BO_3$, 1.5.

In addition, the mixing water volume must only be 90 ml.

On retaining for the various constituents the following volume weights:
CLC 45: $m_x = 2.90$,
SECAR 71: $m_y = 3.00$,
FUMED SILICA: $m_z = 2.00$,
the weights involved for a total volume of "binders" $V_c = 400$ ml are respectively equal to:

$$M_x = \frac{X \cdot V_c}{\frac{X}{m_x} + \frac{Y}{m_y} + \frac{Z}{m_z}} = \frac{162.155 \times 400}{114.060} = 568.7 \text{ g},$$

$$M_y = \frac{Y \cdot V_c}{\frac{X}{m_x} + \frac{Y}{m_y} + \frac{Z}{m_z}} = \frac{153.528 \times 400}{114.060} = 538.4 \text{ g},$$

$$M_z = \frac{Z \cdot V_c}{\frac{X}{m_x} + \frac{y}{m_y} + \frac{z}{m_z}} = \frac{13.937 \times 400}{114.060} = 48.9 \text{ g}.$$

In this example, the water/cement ratio of the mixture is low and it is consequently indispensable to add a fluidizing agent in order to obtain a consistency favorable for mixing directly within the drum. This fluidizing agent can be incorporated in solid, e.g. powder form into the cement and the siliceous additive, so as to deflocculate, as from the first moments of hydration, the particles of fines and in particular those of the siliceous compound.

The fluidizing agent dose used is dependent on the weight of the non-aluminous cement and the weight of the siliceous compound, because the aluminous cement is not very sensitive to its action. When the fluidizing agent is constituted by a product in the melanine group of the Melment type, the recommended dose is 1 kg for 100 kg of cement, so that in this example 6.2 g of fluidizing agent are used.

In addition, the incorporation of this fluidizing agent helps to temporarily isolate the ion exchange resin grains from their new chemical environment by means of a surfactant film. Thus, the latter limits the violent ion exchanges and the risks of excessively fast setting of the cement.

The complete formulation used for the conditioning of 1 liter of compressed-decanted ion exchange resins is definitively as follows:
REI WASTE: 1 l,
WATER: 90 g,
FUMED SILICA: 49 g,
CLC 45: 569 g,
SECAR 71: 538 g,
$H_3BO_3$: 15 g,
MELMENT: 6.2 g.

The total volume is approximately 1.5 l with a water/cement equivalent ratio of 0.3.

The following procedure is adopted for conditioning purposes.

Into the drum are firstly introduced the compressed-decanted ion exchange resins, followed by the mixing water, the fluidizing agent, the fume silica, the boric acid, the aluminous cement and the non-aluminous cement.

Thus, it is preferable to incorporate the siliceous additive prior to the two cements in order to permit an effective deflocculation in the absence of alkaline pH, the grains of resins aiding the dispersion by attrition. However, it is also possible to incorporate the two hydraulic binders, i.e. the aluminous cement and non-aluminous cement in a simultaneous manner, as a preformulated composite binder. It is also possible to introduce together the waste, the mixing water, the fluidizing agent, the fumed silica and the boric acid, followed by the two cements.

Prior to the introduction of the cements, everything is mixed for at least 3 minutes. This is followed by the introduction of the aluminous cement and the non-aluminous cement and mixing is continued for at least 3 minutes, but for no more than 10 minutes. The cements are introduced in the liquid phase, whilst controlling the flow rate, in order not to block the mixing system by a massive discharge.

At the end of mixing, the mixture has still not hardened and has:
a liquid consistency for 30 minutes,
a thixotropic character so that the mixture must not be exposed to vibrations, otherwise the constituents would segregate,
a varying setting between 1 and 24 hours,
an absence of sweating for 24 hours.

Once hardened, the enveloped object has the following characteristics: an absence of cracking under water, mechanical strength characteristics exceeding 12 MPA after 28 days permitting the handling thereof, a mineralogical composition evolving well beyond that after 28 days related to the mechanical strength characteristics; mainly straetlingite, calcium monoboroaluminate and in a subsidiary manner borated ettringite.

The evolution of the material in the confined state, in a tight enclosure, or preferably under water, leads to an improvement to the mechanical strength characteristics after 90 days, the crystallization of the straetlingite being more easily completed in the absence of drying.

EXAMPLE 2: CONDITIONING BORATED CONCENTRATES

In this case, the presence of boron is perfectly identified and as the waste to be treated is an aqueous solution, it is possible to eliminate the addition of orthoboric acid, water and the fluidizing additive.

It is possible to choose an incorporation level equal to 4/7, i.e. a $V_L/V_T$ ratio of 4/7 with $V_L$ representing the real volume of the liquid waste. As $V_T = V_L + V_C$, with $V_C$ representing the volume of the cements and the siliceous additive, we obtain:

$$V_L/V_C = 4/3 = u_P.$$

Thus, the volumes used for conditioning 1 liter of concentrate are $V_L=1000$ ml, $V_C=750$ ml, i.e. a total volume $V_T$ of 1750 ml.

In this case, the incorporation level of close to 57% determines an equivalent water/cement ratio of approximately 0.45.

If use is made of the same cements and the same siliceous compound as in example 1, the weights used for a total binder volume of 750 ml are respectively equal to:

Non-aluminous
cement : $M'_x = \dfrac{X \cdot V_C}{\Sigma V_C} = \dfrac{162.155 \times 750}{114.060} = 1066.2$ g,
(CLC 45)

Aluminous
cement : $M'_y = \dfrac{Y \cdot V_C}{\Sigma V_C} = \dfrac{153.528 \times 750}{114.060} = 1009.5$ g,
(SECAR 71)

Siliceous
additive : $M'_z = \dfrac{Z \cdot V_C}{\Sigma V_C} = \dfrac{13.937 \times 750}{114.060} = 91.6$ g,
(FUMEDSILICA)

in which $V_C = \dfrac{X}{m_x} + \dfrac{Y}{m_y} + \dfrac{Z}{m_z}$

The formulation for enveloping 1 liter of concentrate is definitively as follows:
BORATED CONCENTRATE WASTE: 1 l,
FUMED SILICA: 92 g,
CLC 45: 1066 g,
SECAR 71: 1010 g.

In order to carry out conditioning, the procedure of example 1 can be adopted, the constituents being introduced in the following order:
(1) liquid concentrate,
(2) siliceous additive,
(3) aluminous cement,
(4) non-aluminous cement.

It is possible to mix together the concentrate and fumed silica for at least 3 minutes prior to the introduction of the cements in a successive or simultaneous manner. Following cement introduction, mixing is continued for 3 to 10 minutes. After said mixing, the fresh mixture has a liquid consistency for 30 minutes following the start of mixing, slow setting occurring within 24 hours and an absence of sweating after 24 hours.

After hardening, the mixture has an absence of cracking under water, a mechanical compressive strength exceeding 20 MPa after 28 days and increasing significantly thereafter and a mineralogical composition evolving well beyond 28 days and comprising mainly straetlingite, calcium monoboroaluminate and borated ettringite.

According to a second embodiment, the inventive process is performed for forming in a minority proportion mineral phases of straetlingite, borated ettringite and/or calcium monoboroaluminate starting with boron-containing waste.

For this purpose use is made of mixtures of aluminous cement and Portland cement, highly enriched with the latter and optionally containing a siliceous compound. With a Portland cement/aluminous cement ratio exceeding 4, e.g. 10 or 20, the hydration of the Portland cement is activated by the aluminous cement, but under conditions remote from those of typical prompt mixtures. Therefore, the regulation of the mixture requires less boron. In this case, the hardened matrix contains mainly the conventional hydrated calcium silicates of the Portland cement and in a small proportion straetlingite, borated ettringites and/or monoboroaluminate.

As in the first embodiment, the regulation of the setting by the borate ions of the waste, as well as the addition determines a slow development of the hydration making it possible to progressively remove the heat.

The presence of a small amount of water necessary for obtaining high mechanical strength characteristics also involves the use of a fluidizing agent.

In order to carry out the conditioning in accordance with this second inventive embodiment, a rigorous operating procedure must be respected, particularly with regards to the order of introducing the different constituents. It is therefore important for the borated or unborated waste accompanied by the systematic boron addition is introduced into an aqueous medium already containing $Ca^{++}$ ions in solution.

Thus, most of the boron reacts directly in this case with the calcium, therefore permitting, following the introduction of the cement, a normal hydration of the latter. Bearing in mind the small aluminous cement quantity in this second embodiment, the activation of the Portland-based cement would not be obtainable if the cement was introduced following the borated waste, thus leading to the immediate formation of a borated cortex around the cement grains with blocking of the hydration reaction.

In order that the boron can react with an already calcium-containing solution, it is sufficient for this purpose to introduce the cement in two portions, in accordance with the following operating procedure, which takes place completely within the mixing drum:

(a) introduction of the mixing water, half the fluidizing agent and any siliceous additive,
(b) introduction of 1/5 of the non-aluminous cement and mixing for a minimum of 3 minutes,
(c) introduction of the waste and the boron (case of REI) with mixing for a minimum of 3 minutes, and
(d) introduction of the remaining 4/5 of the non-aluminous cement, then the aluminous cement and the last half of the fluidizing agent.

During these various operations, mixing must not be interrupted so as to prevent segregation prior to complete mixing.

EXAMPLE 3

A description will now be given of the use of the second embodiment for the treatment of an Amberlite resin of type IRN-150L in mixed beds, containing boron and lithium and which has a water content: $W=52.5\%$ and an apparent density: $d_a=1042$ g/l apparent.

While using a resin void index of $U_{REI}=\frac{1}{3}$ and an apparent volume incorporation level of the compressed-decanted REI with their immersion water and $V_T$ the total volume of the enveloped object (REI+matrix), it follows that $V_{REI}=\frac{3}{8}V_T$, i.e. that the real volume of the ion exchange resins occupies 37.5% of the total volume of the enveloped object.

Thus:
the paste volume: $V_P=V_T-V_{REI}=5/8 V_T$
the volume of the cements (and siliceous additive): $V_C=V_P/1=U_P=V_T/3$ whilst taking up = $V_E/V_C=0.875$
total water volume: $V_E=V_P-V_C=7/24 V_T$
saturation water volume: $V_{ESAT}=V_{APP}-V_{REJ}=V_T/8$
mixing water volume: $V_{EGA}=V_E-V_{ESAT}=V_T/6$ The volumes used for cementing 1 liter apparent of compressed-decanted REI are therefore as follows: $V_{REI}=750$ ml, $V_{ESAT}=250$ ml, $V_{EGA}=333.33$ ml, $V_C=666.66$ ml, i.e. $V_T=2000$ ml and $V_P=1250$ ml.

The composition of the matrix, i.e. the detail of $V_C$, is on this occasion given as a function of the optimum percentages observed for the aluminous cement Y and the fumed silica Z within the mixture essentially containing a Portland cement X, i.e. $V_X=80\%$ $V_C$, $V_Y=10\%$ $V_C$, $V_Z=10\%$ $V_C$.

By using a CPA55, a SECAR 71 and fumed silica, whose respective volume weights are $m_x=3.2$, $m_y=3.0$ and $m_z=2.0$, the weights involved for a volume of "binders" of 666.66 ml are: $M_X=1706.7$ g, $M_Y=200.0$ g, $M_Z=133.3$ g.

Moreover, the addition of soluble boron in the form of orthoboric acid $H_3BO_3$ is brought to 5 g only, bearing in mind the low aluminous cement proportion, so that the water volume for mixing must be corrected as follows:

$$V_{EGA}=333.33-5/1.5=330 \text{ ml } (m_{H_3BO_3}=1.5 \text{ g/cm}^3)$$

The low water/cement ratio of the mixture requires a high fluidizing agent dosing, because it is based on the proportion of CPA and fumed silica.

At a rate of 1 kg per 100 kg of cement, the fluidizer weight used, which is of the powder Melment type, is 18.4 g.

The complete formulation used for the conditioning of 1 l of compressed-decanted ion exchange resins is definitively as follows:
REI WASTE: 1 l,
WATER: 330 g,
FUMED SILICA: 135 g,
CPA 55: 1700 g,
SECAR 71: 200 g,
$H_3BO_3$: 5 g,
MELMENT: 18.4 g.
The total volume is approximately 2 l with an equivalent water/cement ratio of 0.286.

In order to carry out conditioning, the mixing of the constituents is carried out in a definitive collection drum using a blade, whose movement is never interrupted between the time of introducing the first constituent and up to the time of introducing the last.

The mixing water and fumed silica are firstly introduced in their entirety with half the fluidizer dose. After mixing for 3 minutes, 1/5 of the Portland cement is reduced, followed at the most 3 minutes later by all the waste and the boric acid. Mixing continues for a further 3 minutes, prior to the introduction of the remaining 4/5 of the Portland cement and the last half of the fluidizer, which are themselves mixed for 3 minutes. The aluminous cement is introduced last with a final mixing of 3 minutes.

After a total mixing time of min. 15 minutes, the still unhardened mixture has a fluid consistency for 30 minutes with a thixotropic character and a varying setting speed of between 1 and 24 hours with an absence of sweating.

Once hardened, the enveloped object has a mechanical strength better than 20 MPa at 28 days, permitting handling, an absence of cracking under water and a mineralogical composition revealing a low proportion of straetlingite and/or borated minerals, such as monoboroaluminate and boroettringite.

In this second embodiment of the invention, as in the first, the improvement of the confinement can be obtained through the presence of an over-enveloping, whose putting into place involves the mixing means used.

Generally, mixing takes place with a mixer having a "lost" blade, which is immersed in the enveloped object after use and touches the bottom of the drum and is then disconnected from the motor block. The length of the blade is such that its end projects at least 5 cm over the top of the drum and will subsequently be used for gripping the drum. Furthermore, in order that said handling can take place under good conditions, it is necessary for the drum content to be sufficiently hardened and it is generally preferable to wait 15 days to obtain the requisite mechanical strength.

Thus, when the drum leaves the mixing station, it is passed to a provisional storage area, e.g. constituted by a baryte concrete tunnel ensuring an adequate biological protection to permit any work to take place in the remainder of the area.

Following said storage, over-enveloping can take place by placing round the drum a mortar layer, giving the necessary mechanical strength and confinement properties. This mortar layer can be formed from a mixture including cement, siliceous sand, fumed silica, a smectic clay such as bentonite and water. The composition of this mixture is preferably that of a compact mortar containing very little water, generally less than 30% by weight water.

Generally, to this composition is added a fluidizer in order to facilitate its placing round the drum by pouring or injecting. This fluidizer must not entrain air, so as not to reduce the mechanical performance characteristics of the package and will be all the more effective if the mortar contains, apart from a large amount of cement, fumed silica and a clay such as bentonite.

The cement used is a slag-based binder, e.g. a cement of type CLC or CLK. However, it is also possible to use other cements, such as CPA.

The conjugate action of the very reactive particles of amorphous silica and clay gives the material a very low permeability and a high confinement power.

In order to retain high mechanical strength characteristics better than 60 MPa after 28 days and prevent excessive contraction, it is appropriate to limit the clay quantity to less than 5% of the volume of the fines (cements, sand, fumed silica and clay).

For example, it is possible to use the following mortar composition:
siliceous sand 0-4 mm: 1170 kg/m$^3$,
cement CLC 45: 650 kg/m$^3$,
fumed silica: 130 kg/m$^3$,
smectic clay: 30 kg/m$^3$,
water+fluidizer: 260 l/m$^3$.

In order to place said composition round the drum containing the waste incorporated into the cement, the following procedure can be adopted. The drum can be placed within a container, which can e.g. be of concrete, while maintaining it at the desired distance from the container walls by a lifting system connected to the blade and by remote manipulation arms. Into the container and around the drum is then poured the mortar, i.e. the mixture of cement, siliceous sand, fumed silica, smectic clay and water, which has been prepared in a mixer.

For example, it is possible to use a mixer with a capacity of 500 l, which is a commercially available apparatus with multiple blades having respectively circular and epicycloid movements ensuring a perfect homogenization of the mixture. After mixing, the mixture is pumped from a return tank and fed into the container by means of a short, flexible injection pipe. The pump can be of the volumetric or mechanical type and is able to exert an injection pressure of at least 1 MPa. Generally, pouring takes place in two stages, in order to give the mortar, which is initially thixotropic, the time to acquire a higher shear strength. Firstly, the mortar is poured very progressively by gravity in order not to trap air or offcenter the drum with respect to the container and this takes place up to a mark made beforehand on the container and which corresponds to the lining of the bottom, while taking account of possible embedding or penetration of the drum into the mortar layer.

After allowing the mortar to stand for 30 minutes, the blade is freed from the lifting system and mortar pouring is continued until level with the container edge. It is possible to add a supplementary mortar volume in order to fill the upper part of the container, because the drum content has been compressed during its putting into place. However, in general a lead disk is placed above the drum to complete the radiation protection and also ensures the ballasting of said drum.

Figure 2:
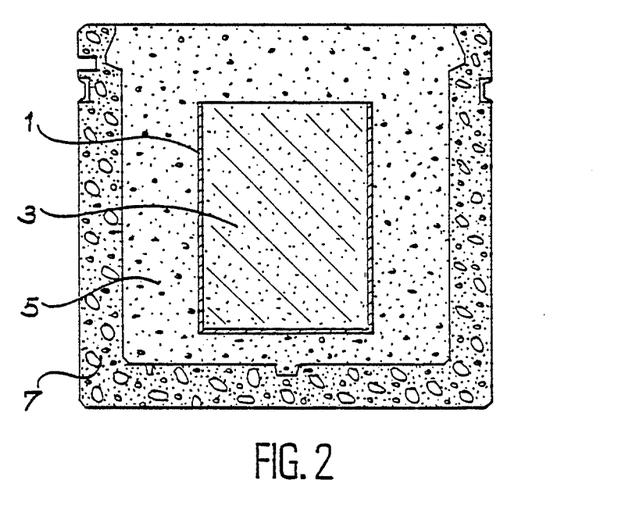
FIG. 2 a vertical section through a product obtained by the inventive process.

FIG. 2 shows the apparatus for the storage of radioactive or toxic waste obtained through the process of the invention. It can be seen that this apparatus comprises a drum 1 containing waste 3 in the form of a dispersion thereof in a mineral matrix having a phase of the straetlingite, calcium monoboroaluminate and/or borated ettringite type. If neccessary, drum 1 is surrounded by a mortar layer 5 placed around the drum and an outer envelope 7, e.g. constituted by a concrete container surrounding the mortar layer 5.

The structure of this apparatus makes it possible to incorporate a high volume of waste into drum 1 without the need for any special fear regarding the intrinsic reduction of the mechanical performance characteristics, provided that an adequate cement quantity is used to permit a tensile stressing of the drum 1 via the lost blade during the placing of drum 1 in container 7.

In said apparatus, the presence of the mortar layer 5 around drum 1 makes it possible to obtain the necessary mechanical properties and ensure the confinement and retention of the radioactive or toxic products. Generally layer 5 is at least 10 cm thick.

The mortar composition is as follows:
siliceous sand 0-4 mn: 1170 kg/m³,
cement CLC 45: 650 kg/m³,
fumed silica: 130 kg/m³,
smectic clay: 30 kg/m³,
water+fluidizer: 260 l/m³.

The fluidizer used is of the sulphonated naphthalene type and the physical characteristics of the fresh mortar are as follows:
flow time to the Marsh cone (diameter 12.5 mm): 100 sec,
setting time: 6 h,
density: 2.24.

The mortar is poured in two portions and then allowed to harden, the characteristics of the product obtained being determined. The physical characteristics of the hardened mortar are as follows:
contraction after 28 days: <400 μm/m (tight enclosure)
compressive strength after 28 days: >80 MPa,
bending strength after 28 days: >10 MPa.

The contraction and strength characteristics are measured on prismatic testpieces of dimensions 4×4×16 cm.

I claim:

1. A process for the conditioning of radioactive or toxic waste which can contain borate ions in a cement-based solid matrix with a view to the storage thereof, which comprises the following successive steps:
   (a) mixing the waste, in the presence of water, with aluminous cement, non-aluminous cement and optionally a compound containing either or both silicon and boron in proportions such that a mixture is formed, which gives rise to the crystallization of at least one stable mineral phase selected from the group consisting of the type straetlingite, calcium monoboraluminate and borated ettringite phases, apart from the standard hydrates of the non-aluminous cement, and
   (b) allowing the mixture to harden in order to form the solid matrix containing at least one of these phases.

2. Process according to claim 1, wherein a mortar layer is then placed around the hardened mixture.

3. Process according to claim 1 wherein the radioactive waste to be conditioned is constituted by borated liquid concentrates and in that they are mixed in stage (a) with aluminous cement, non-aluminous cement based on Portland clinker and a siliceous compound.

4. Process according to claim 1 wherein in stage (a), the waste is mixed with water, aluminous cement, non-aluminous cement based on Portland clinker, a siliceous compound and a compound containing boron.

5. Process according to claim 1 wherein in stage (a), the proportions are such that the weight ratio of water/(non-aluminous cement+aluminous cement+siliceous compound) is below 0.5.

6. Process according to claim 5, wherein the weight ratio of non-aluminous cement to aluminous cement is in the range 1 to 20.

7. A process according to claim 1 wherein the non-aluminous cement is selected from the group consisting of ordinary Portland cement (CPA), Portland cement with an additive (CPJ) and cement with blast furnace slag and fly ash (CLC).

8. Process according to any one of the claims 1 to 7, characterized in that the siliceous compound is chosen from the group consisting of pozzuolanas, clays, metakaolin, kieselguhr, fumed silica, ground quartz, silica gels, powders of glass and sodium silicate.

9. Process according to claim 1 wherein the boron compound is boric acid, a borate or borax.

10. Process according to claim 1 wherein in stage (a) a cement fluidizing agent is added to the mixture.

11. Process according to claim 10, wherein the fluidizing agent is a naphthalene sulphonate or a melamine-type compound.

12. Process according to claim 2, wherein the mortar layer is formed from a mixture comprising cement, siliceous sand, fumed silica, a smectic clay and water.

13. Process according to claim 12, wherein the smectic clay is a bentonite.

14. Process according to either of claims 12 and 13, wherein the mixture further comprises a fluidizing agent.

15. Process according to any one of the claims 1, to 4 and 10, wherein in stage (a), the waste is firstly mixed with the water and optionally the fluidizing agent, the siliceous compound, part of the non-aluminous cement and/or the boron-containing compound, followed by the addition of the aluminous cement and the non-aluminous cement.

16. Process according to any one of the claims 1 to 4 and 10, wherein in stage (a), the ratio of the real volume of the waste to the total volume (waste+water+fluidizing agents+siliceous compound+boron-containing compound+aluminous cement+Portland cement) is at the most 0.6.

* * * * *